(12) United States Patent
Holoubek

(10) Patent No.: US 8,106,740 B2
(45) Date of Patent: Jan. 31, 2012

(54) RESISTANCE THERMOMETER

(75) Inventor: Jiri Holoubek, Wattwil (CH)

(73) Assignee: Innovative Sensor Technology IST AG, Wattwil (CH)

( * ) Notice: Subject to any disclaimer, the term of this patent is extended or adjusted under 35 U.S.C. 154(b) by 251 days.

(21) Appl. No.: 12/451,463

(22) PCT Filed: May 9, 2008

(86) PCT No.: PCT/EP2008/055748
§ 371 (c)(1),
(2), (4) Date: Nov. 13, 2009

(87) PCT Pub. No.: WO2008/138887
PCT Pub. Date: Nov. 20, 2008

(65) Prior Publication Data
US 2010/0117784 A1    May 13, 2010

(30) Foreign Application Priority Data

May 16, 2007 (DE) .......................... 10 2007 023 434

(51) Int. Cl.
*H01C 7/10* (2006.01)
(52) U.S. Cl. ...................................... 338/22 R; 338/28
(58) Field of Classification Search ............... 338/22 R, 338/25, 28; 428/670, 192, 209, 415; 429/33, 429/42, 309
See application file for complete search history.

(56) References Cited

U.S. PATENT DOCUMENTS

| | | | | |
|---|---|---|---|---|
| 3,866,158 A | * | 2/1975 | Reber et al. | 338/25 |
| 4,722,609 A | * | 2/1988 | Epstein et al. | 374/30 |
| 5,896,081 A | | 4/1999 | Tzeng | |
| 6,232,618 B1 | * | 5/2001 | Wienand et al. | 257/48 |
| 6,353,381 B1 | * | 3/2002 | Dietmann et al. | 338/25 |
| 6,762,672 B2 | * | 7/2004 | Taguchi et al. | 338/25 |
| 7,674,038 B2 | * | 3/2010 | Heine et al. | 374/141 |

FOREIGN PATENT DOCUMENTS

| | | |
|---|---|---|
| DE | 25 07 731 | 9/1976 |
| DE | 38 06 156 | 9/1988 |
| DE | 40 20 383 | 1/1992 |
| DE | 40 26 061 | 2/1992 |
| DE | 43 00 084 | 7/1994 |
| DE | 195 40 194 | 2/1997 |
| DE | 198 48 524 | 12/1999 |
| DE | 198 05 531 | 12/2000 |
| DE | 102 08 533 | 6/2005 |
| EP | 0 471 138 | 2/1992 |
| JP | 02058304 | 2/1990 |
| JP | 2004 239700 | 8/2004 |

* cited by examiner

*Primary Examiner* — Kyung Lee
(74) *Attorney, Agent, or Firm* — Bacon & Thomas, PLLC

(57) ABSTRACT

A resistance thermometer, composed of a plurality of components, at least comprising: at least one substrate, which is composed essentially of a material, whose thermal coefficient of expansion is essentially greater than 10.5 ppm/K; at least one resistive element, which is arranged on the substrate; and at least one electrically insulating, separating layer, which is arranged essentially between the resistive element and the substrate. The invention includes that the effective thermal coefficient of expansion $TCE_{eff}$ is greater than or equal to the thermal coefficient of expansion of the bulk metal of the resistive element.

20 Claims, 1 Drawing Sheet

RESISTANCE THERMOMETER

TECHNICAL FIELD

The invention relates to a resistance thermometer composed of a plurality of components, at least comprising: at least one substrate, which is composed essentially of a material, whose thermal coefficient of expansion is essentially greater than 10.5 ppm/K; at least one resistive element, which is arranged on the substrate; and at least one electrically insulating, separating layer, which is arranged essentially between the resistive element and the substrate.

BACKGROUND DISCUSSION

Known in the state of the art already is the effect of the character of the substrate on the characteristic curve of the thereon located, resistive element. German patents, DE 43 00 084 A1 and DE 195 40 194 C1 indicate, for example, that the characteristic curve of the resistance thermometer has the desired properties, when the thermal coefficient of expansion (TCE), also known as the coefficient of thermal expansion, of the substrate of magnesium titanate lies in the range between 8.5 and 10.5 ppm/K.

Known in the state of the art are temperature measuring devices, in the case of which an electrical, temperature dependent resistance of a resistive element is measured and evaluated. For the evaluation, it is required that the temperature resistance curve, i.e. the relevant characteristic curve of the element, be known.

Known, especially, are resistive elements, which are applied with thin layer techniques onto an electrically insulating substrate. The thin film is composed, as a rule, of platinum or nickel, with or without doping, and the substrate is composed most often of $Al_2O_3$.

Known in the state of the art already is the effect of the character of the substrate on the characteristic curve of the thereon located, resistive element. DE 43 00 084 A1 and DE 195 40 194 C1 indicate, for example, that the characteristic curve of the resistance thermometer has the desired properties, when the thermal coefficient of expansion (TCE), also known as the coefficient of thermal expansion, of the substrate of magnesium titanate lies in the range between 8.5 and 10.5 ppm/K.

In the case of the embodiments of the state of the art, the substrate has always still a very large influence on the characteristic curve, or on the TCR value, i.e. the temperature coefficient of the resistance thermometer. Especially, it is not possible in the state of the art to bring the TCR value of the resistance thermometer into the vicinity of the material of the resistive element as bulk material. Bulk material refers to a state of a material in contrast to the thin film or powder form and means that the material is present in a shape, so that it can be considered as infinitely large in all three dimensions from an atomic point of view. For example, it is, according to the state of the art, practically not possible, to produce platinum measuring resistors with a TCR value in the region above 3900 ppm/K, and yet such values are typical for wound measuring resistors of pure platinum. Furthermore, the shape of the characteristic curve deviates also in the case of resistance thermometers with lower TCR values (typically at 3850 ppm/K) from the shape prescribed according to DIN IEC 751. This has the result, that especially in the case of wider temperature ranges, or in the case of high accuracy requirements, the prescribed tolerance band is departed from. Other negative effects of poor material matching shows up in hysteresis (memory effect) and in poor, long time stability of measured values.

SUMMARY OF THE INVENTION

An object of the invention is to provide a resistance thermometer, whose temperature coefficient (TCR) lies above 3900 ppm/K.

The object is achieved according to the invention by features including that the components of the resistance thermometer are embodied and matched to one another in such a manner, that a resulting effective thermal coefficient of expansion $TCE_{eff}$ of the resistance thermometer corresponds to a predeterminable value, wherein the effective thermal coefficient of expansion $TCE_{eff}$ of the resistance thermometer is approximately given essentially by the following formula:

$$TCE_{eff} = \frac{\sum_{i=1}^{N} TCE_i * d_i * E_i * F_i}{\sum_{i=1}^{N} d_i * E_i * F_i},$$

wherein N is the number of components of the resistance thermometer, index i refers to the individual components, and $TCE_i$, $d_i$ and $E_i$ are, respectively, thermal coefficient of expansion, thickness and elasticity of the individual components, and wherein $F_i$ takes into consideration a geometric factor, and the effective thermal coefficient of expansion $TCE_{eff}$ is greater than or equal to the thermal coefficient of expansion of the bulk metal of the resistive element. The structure of the resistance thermometer includes, at least, substrate—separating layer—resistive element. The separating layer is, above all, required, in order to avoid electrical contact between the substrate and the resistive element.

The geometric factors $F_i$ of the individual components lie between 0 and 1 and take into consideration, among other things, the spatial arrangement of the individual components, i.e. the individual layers. The formula represents a weighted interpolation over the resistance thermometer.

An embodiment of the invention provides that the substrate is composed essentially of a material, whose thermal coefficient of expansion is essentially greater than 11 ppm/K.

An embodiment of the invention includes that the substrate is composed essentially of a material, whose thermal coefficient of expansion lies essentially between 10.5 and 13.5 ppm/K.

An embodiment of the invention provides that the resistive element is deposited on the substrate using a thin film technique. Examples for such thin layer techniques are sputtering or vapor deposition.

An embodiment of the invention includes that the resistive element is composed essentially of platinum and/or nickel.

An embodiment of the invention provides that the resistive element is free of an alloying substance or provided with an alloying substance.

An embodiment of the invention includes that the resistive element has a coating thickness between 0.1 μm and 5 μm.

Another embodiment of the invention provides that the resistive element has a coating thickness between 0.1 μm and 2 μm.

An embodiment of the invention provides that the electrically insulating, separating layer is composed of glass, ceramic or glass ceramic.

An embodiment of the invention includes that the electrically insulating, separating layer has a thickness between 0.5 µm and 100 µm.

An embodiment of the invention provides that the electrically insulating, separating layer has a thickness between 0.5 µm and 50 µm.

An embodiment of the invention provides that the electrically insulating, separating layer has a thermal coefficient of expansion between 0.4 and 8 ppm/K.

An embodiment of the invention includes that at least one electrically insulating covering is provided, which is arranged essentially on the side of the resistive element facing away from the substrate.

An embodiment of the invention provides that the electrically insulating covering is composed essentially of a glass, ceramic, glass ceramic or polymer layer.

An embodiment of the invention includes that the electrically insulating covering has a thickness between 0.5 µm and 100 µm.

An embodiment of the invention provides that the substrate is composed essentially of zirconium oxide. Zirconium oxide ($ZrO2$) is electrically conductive from a temperature above 200° C., so that the above mentioned separating layer between the substrate and the resistive element is advantageous.

An embodiment of the invention includes that the thickness of the substrate lies between 0.15 and 1.0 mm.

An embodiment of the invention includes that the thickness of the substrate lies between 0.15 and 0.5 mm.

An embodiment of the invention includes that the thickness of the substrate lies between 0.2 and 1.0 mm. Such thin substrates, especially of zirconium oxide, have, for example, the advantages, that they provide a low hysteresis for the resistance thermometer and also lead to an improved characteristic curve. A substrate of zirconium oxide with a thickness of 0.38 mm leads, for example, to a TCR value of about 3913 ppm/K.

An embodiment of the invention provides that the substrate is composed essentially of zirconium oxide, that the thickness of the substrate lies between 0.2 and 1.0 mm, and that the electrically insulating, separating layer is arranged essentially between the resistive element and the substrate. The separating layer prevents electrical contact between the substrate and the resistive element, which is especially important, since zirconium is electrically conductive from a temperature above about 200° C. Advantageous is the embodiment wherein the substrate is composed essentially of a material, whose thermal coefficient of expansion lies essentially between 10.5 and 13.5 ppm/K. This embodiment provides that the resistance thermometer has a temperature coefficient above 3900 ppm/K.

An embodiment of the invention provides that at least one inner, equalizing layer is provided on the side of the substrate facing away from the resistive element. The inner, equalizing layer serves for compensation of thermal expansion effects of the separating layer.

An embodiment of the invention includes that the inner, equalizing layer is formed, with reference to a change of expansion caused by temperature, essentially equally as the separating layer.

An embodiment of the invention provides that the inner, equalizing layer is composed essentially of the same material as the separating layer.

An embodiment of the invention provides that at least one outer, equalizing layer is provided on the side of the substrate facing away from the resistive element. The outer, equalizing layer serves for compensation of thermal expansion effects of the covering.

An embodiment of the invention includes that the outer, equalizing layer is arranged on the side of the inner, equalizing unit facing away from the substrate.

An embodiment of the invention provides that the outer, equalizing layer is formed, with reference to a change of expansion caused by temperature, essentially equally as the covering.

An embodiment of the invention includes that the outer, equalizing layer is composed essentially of the same material as the covering.

An embodiment of the invention includes that the covering is composed essentially of the same material as the separating layer.

An embodiment of the invention provides that the substrate is composed essentially of zirconium oxide, that the substrate has a thickness between 0.3 and 0.5 mm, that the resistive element is composed essentially of platinum, that the resistive element has a thickness between 0.45 and 2 µm, that the separating layer has a thickness between 0.5 and 40 µm and is composed essentially of a glass ceramic having a thermal coefficient of expansion between 6 and 7.5 ppm/K, and that the covering has a thickness between 0.5 and 40 µm and is composed essentially of a glass ceramic having a thermal coefficient of expansion between 6 and 7.5 ppm/K. Such an arrangement leads to the fact that the temperature coefficient of the resistance thermometer lies between 3910 and 3925 ppm/K.

An embodiment of the invention provides that the substrate is composed essentially of zirconium oxide, that the substrate has a thickness between 0.3 and 0.7 mm, that the resistive element is composed essentially of platinum, that the resistive element has a thickness between 0.45 and 2 µm, that the separating layer has a thickness between 5 and 40 µm and is composed essentially of a glass ceramic having a thermal coefficient of expansion between 6 and 7.5 ppm/K, and that the covering has a thickness between 5 and 40 µm and is composed essentially of a glass ceramic having a thermal coefficient of expansion between 6 and 7.5 ppm/K. Such an arrangement leads to the fact that the temperature coefficient of the resistance thermometer lies between 3910 and 3925 ppm/K.

An embodiment of the invention includes that the substrate is composed essentially of zirconium oxide, that the substrate has a thickness between 0.3 and 0.5 mm, that the resistive element is composed essentially of platinum having at least one alloying substance, that the resistive element has a thickness between 0.45 and 2 µm, that the separating layer has a thickness between 0.5 and 40 µm and is composed essentially of a glass ceramic having a thermal coefficient of expansion between 6 and 7.5 ppm/K, and that the covering has a thickness between 5 and 40 µm and is composed essentially of a glass ceramic having a thermal coefficient of expansion between 6 and 7.5 ppm/K. Such an arrangement produces a temperature coefficient of the resistance thermometer of 3850 ppm/K with a characteristic curve according to DIN IEC 751.

An embodiment of the invention includes that the substrate is composed essentially of zirconium oxide, that the substrate has a thickness between 0.3 and 0.7 mm, that the resistive element is composed essentially of platinum having at least one alloying substance, that the resistive element has a thickness between 0.45 and 2 µm, that the separating layer has a thickness between 5 and 40 µm and is composed essentially of a glass ceramic having a thermal coefficient of expansion between 6 and 7.5 ppm/K, and that the covering has a thickness between 5 and 40 µm and is composed essentially of a glass ceramic having a thermal coefficient of expansion between 6 and 7.5 ppm/K. Such an arrangement produces a temperature coefficient of the resistance thermometer of 3850 ppm/K with a characteristic curve according to DIN IEC 751.

An embodiment of the invention provides that the substrate is composed essentially of zirconium oxide, that the substrate has a thickness between 0.3 and 0.5 mm, that the resistive element is composed essentially of nickel, that the resistive element has a thickness between 0.1 and 2 µm, that the separating layer has a thickness between 0.5 and 40 μm, that the separating layer is composed essentially of a glass ceramic, that the separating layer has a thermal coefficient of expansion between 6 and 7.5 ppm/K, and that the covering is composed essentially of a polymer or of glass. Such an arrangement effects a temperature coefficient of the resistance thermometer between 6700 and 6740 ppm/K.

An embodiment of the invention provides that the substrate is composed essentially of zirconium oxide, that the substrate has a thickness between 0.3 and 0.7 mm, that the resistive element is composed essentially of nickel, that the resistive element has a thickness between 0.3 and 2 μm, that the separating layer has a thickness between 5 and 40 μm, that the separating layer is composed essentially of a glass ceramic, that the separating layer has a thermal coefficient of expansion between 6 and 7.5 ppm/K, and that the covering is composed essentially of a polymer or of glass. Such an arrangement effects a temperature coefficient of the resistance thermometer between 6700 and 6740 ppm/K.

An embodiment of the invention includes that the substrate is composed essentially of zirconium oxide, which is stabilized with yttrium between 3 mol-% and 8 mol-%.

An embodiment of the invention provides that the substrate is composed essentially of zirconium oxide, which is stabilized with scandium between 3 mol-% and 11 mol-%.

An embodiment of the invention includes that the substrate is composed essentially of zirconium oxide, which is stabilized with magnesium between 0.5 mol-% and 4 mol-%.

BRIEF DESCRIPTION OF THE DRAWING

The invention will now be explained in greater detail on the basis of the appended drawing, the sole FIGURE of which shows as follows.

DETAILED DISCUSSION IN CONJUNCTION WITH THE FIGURE

Figure 1:
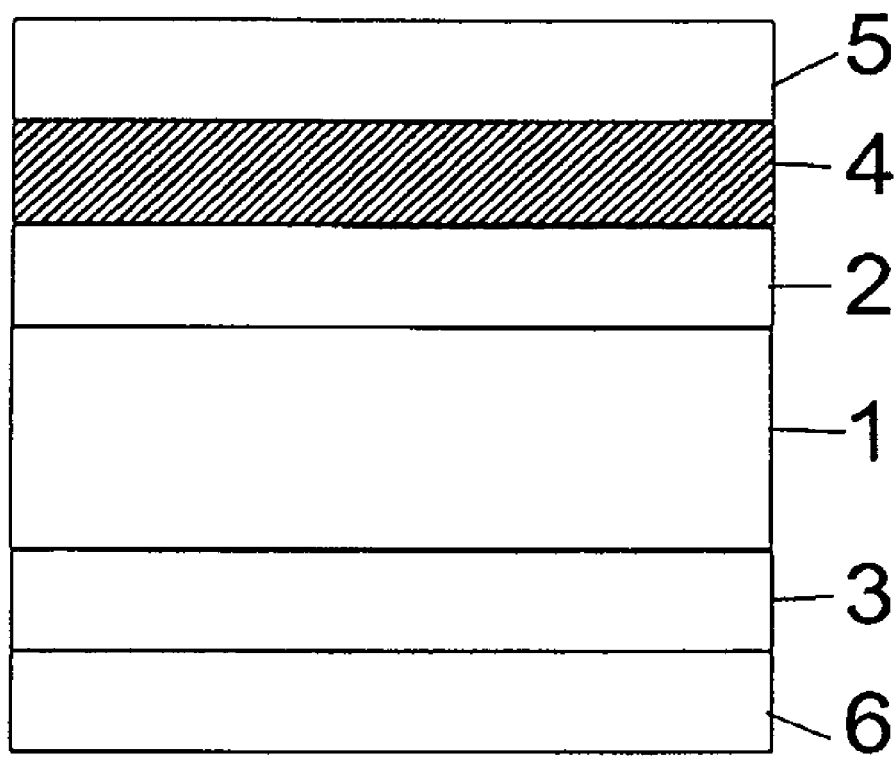
FIG. 1 is a schematic drawing of a section through a resistance thermometer of the invention.

FIG. 1 shows a section through a schematic resistance thermometer. Electrical contacts, housing etc. are, thus, not shown. The temperature is in such case ascertained through evaluation of the electrical resistance. For this, knowledge concerning the characteristic curve of the resistance thermometer is required.

The resistance thermometer or, generally, the temperature sensor is composed, here, of a substrate 1, on which an electrically insulating, separating layer 2 has been applied. Above the separating layer 2 is located the resistive element 4, which serves for the actual measuring. In such case, involved is a metal layer, which has a suitable structure, e.g. a meander pattern, and which is applied by thin film, or thick film, techniques. The separating layer 2 is especially advantageous for the case, in which the substrate is composed of zirconium oxide (ZrO2), which, at temperatures above 200° C., is electrically conducting. I.e. the separating layer 2 prevents direct electrical contact between the, in given cases, conductive substrate 1 and the resistive element 4, which here especially is embodied as, and understood to be, a layer. Above the resistive element is provided a covering 5, which, among other things, serves for passivating and, generally, protection of the metal layer of the resistive element 4.

In the here illustrated case, furthermore, inner 3 and outer, equalizing layers 3 and 6, respectively, are provided, which compensates temperature related, expansion changes of the separating layer 2 and the covering 5, respectively. For such purpose, the equalizing layers 3, 6 have, with reference to thermal expansion properties, essentially the same properties as the separating layer 2 and the covering 5, respectively. Preferably, the inner, equalizing layer is composed of the same material as the separating layer 2 and the two layers 2, 5 have equal dimensioning. The same is true for the outer, equalizing layer 6 and the covering 5.

The resistance thermometer shown here is composed, thus, of a total of 6 layers, which are numbered as follows: 1—substrate; 2—separating layer; 3—inner, equalizing layer; 4—resistive element; 5—covering and 6—outer, equalizing layer.

Each of these layers has a thickness $d_i$, a modulus of elasticity $E_i$ and a thermal coefficient of expansion $TCE_i$. Furthermore, each layer is characterized by a geometric form factor $F_i$ lying between 0 and 1, which takes into consideration the spatial arrangement of the individual layers.

From these variables, there results, approximately, the effective thermal coefficient of expansion $TCE_{eff}$ of the total arrangement, thus of the total resistance thermometer, as follows:

$$TCE_{eff} = \frac{\sum_{i=1}^{N} TCE_i * d_i * E_i * F_i}{\sum_{i=1}^{N} d_i * E_i * F_i}$$

In such case, it should especially hold, that $TCE_{eff} >= TCE_{bulk\ metal}$ of the material of the resistive element 4 as bulk metal, i.e. the thermal coefficient of expansion $TCE_{eff}$ of the resistance thermometer should be greater than or equal to the thermal coefficient of expansion $TCE_{bulk\ metal}$ of the material of the resistive element 4 as bulk metal.

In such case, in the above formula, the index i indexes the individual layers. N, in the illustrated case, equals 6.

On the basis of this formula, then, the thermometer can be suitably dimensioned for a required temperature coefficient of the resistance thermometer.

Especially, it has been found, that the temperature coefficient of the resistance thermometer increases with the coating thickness of the substrate 1, while an increasing of the thickness of the separating layer 2, in turn, reduces the temperature coefficient.

The invention claimed is:

1. A resistance thermometer, composed of a plurality of components, comprising:
   at least one substrate, which is composed essentially of a material, whose thermal coefficient of expansion is essentially greater than 10.5 ppm/K;
   at least one resistive element, which is arranged on said at least one substrate; and
   at least one electrically insulating, separating layer, which is arranged essentially between said at least one resistive element and said at least one substrate; wherein:
   said at least one substrate, said at least one resistive element and said at least one separating layer are embodied and matched to one another in such a manner, that a resulting effective thermal coefficient of expansion $TCE_{eff}$ of the resistance thermometer corresponds to a predeterminable value, wherein the effective thermal coefficient of expansion $TCE_{eff}$ of the resistance thermometer is approximately given essentially by the following formula:

$$TCE_{eff} = \frac{\sum_{i=1}^{N} TCE_i * d_i * E_i * F_i}{\sum_{i=1}^{N} d_i * E_i * F_i},$$

wherein N is the number of components of the resistance thermometer, the index i indexes the individual components, and $TCE_i$, $d_i$ and $E_i$ are, respectively, thermal coefficient of expansion, thickness and elasticity of the individual components, and $F_i$ takes into consideration a geometric factor; and the effective thermal coefficient of expansion $TCE_{eff}$ is greater than or equal to the thermal coefficient of expansion of the bulk metal of said at least one resistive element.

2. The resistance thermometer as claimed in claim 1, wherein:

said at least one substrate is composed essentially of a material, whose thermal coefficient of expansion lies essentially between 10.5 and 13.5 ppm/K.

3. The resistance thermometer as claimed in claim 1, wherein:

said at least one resistive element is composed essentially of platinum and/or nickel.

4. The resistance thermometer as claimed in claim 1, wherein:

said at least one resistive element has a coating thickness between 0.1 μm and 2 μm.

5. The resistance thermometer as claimed in claim 1, wherein:

said electrically insulating, separating layer has a thickness between 0.5 μm and 50 μm.

6. The resistance thermometer as claimed in claim 1, wherein:

said electrically insulating, separating layer has a thermal coefficient of expansion between 0.4 and 8 ppm/K.

7. The resistance thermometer as claimed in claim 1, further comprising:

at least one electrically insulating covering, which is arranged essentially on the side of said at least one resistive element facing away from said at least one substrate.

8. The resistance thermometer as claimed in claim 7, wherein:

said electrically insulating covering has a thickness between 0.5 μm and 100 μm.

9. The resistance thermometer as claimed in claim 1, wherein:

said at least one substrate is composed essentially of zirconium oxide.

10. The resistance thermometer as claimed in claim 1, wherein:

the thickness of said at least one substrate lies between 0.15 and 0.5 mM.

11. The resistance thermometer as claimed in claim 1, further comprising:

at least one inner, equalizing layer on the side of said at least one substrate facing away from said at least one resistive element.

12. The resistance thermometer as claimed in claim 11, wherein:

said at least one inner, equalizing layer, with reference to a change of expansion caused by temperature, is formed essentially equally as said at least one separating layer.

13. The resistance thermometer as claimed in claim 7, further comprising:

at least one outer, equalizing layer on the side of said at least one substrate facing away from said at least one resistive element.

14. The resistance thermometer as claimed in claim 13, wherein:

said at least one outer, equalizing layer, with reference to a change of expansion caused by temperature, is formed essentially equally as said at least one, electrically insulating covering.

15. The resistance thermometer as claimed in claim 7, wherein:

said at least one substrate is composed essentially of zirconium oxide;

said at least one substrate has a thickness between 0.3 and 0.5 mm;

said at least one resistive element is composed essentially of platinum;

and has a thickness between 0.45 and 2 μm;

said at least one separating layer has a thickness between 0.5 and 40 μm and is composed essentially of a glass ceramic having a thermal coefficient of expansion between 6 and 7.5 ppm/K; and said at least one, electrically insulating covering has a thickness between 5 and 40 μm and is composed essentially of a glass ceramic having a thermal coefficient of expansion between 6 and 7.5 ppm/K.

16. The resistance thermometer as claimed in claim 7, wherein:

said at least one substrate is composed essentially of zirconium oxide;

said at least one substrate has a thickness between 0.3 and 0.5 mm;

said at least one resistive element is composed essentially of platinum having at least one alloying substance, and has a thickness between 0.45 and 2 μm;

said at least one separating layer has a thickness between 0.5 and 40 μm and is composed essentially of a glass ceramic having a thermal coefficient of expansion between 6 and 7.5 ppm/K; and said at least one, electrically insulating covering has a thickness between 5 and 40 μm and is composed essentially of a glass ceramic having a thermal coefficient of expansion between 6 and 7.5 ppm/K.

17. The resistance thermometer as claimed in claim 7, wherein:

said at least one substrate is composed essentially of zirconium oxide, and has a thickness between 0.3 and 0.5 mm;

said at least one resistive element is composed essentially of nickel, and has a thickness between 0.1 and 2 μm;

said at least one separating layer has a thickness between 0.5 and 40 μm, and is composed essentially of a glass ceramic;

said at least one separating layer has a thermal coefficient of expansion between 6 and 7.5 ppm/K; and said at least one, electrically insulating covering is composed essentially of a polymer or of glass.

18. The resistance thermometer as claimed in claim 1, wherein:

said at least one substrate is composed essentially of zirconium oxide stabilized with yttrium between 3 mol-% and 8 mol-%.

19. The resistance thermometer as claimed in claim 1, wherein:

said at least one substrate is composed essentially of zirconium oxide stabilized with scandium between 3 mol-% and 11 mol-%.

20. The resistance thermometer as claimed in claim 1, wherein:

said at least one substrate is composed essentially of zirconium oxide stabilized with magnesium between 0.5 mol-% and 4 mol-%.

\* \* \* \* \*